Nov. 12, 1929.  P. R. OLIVER, SR  1,735,783

STEERING WHEEL KNOB

Filed June 4, 1928

Inventor

P. R. Oliver, Sr.

By *Clarence A. O'Brien*

Attorney

Patented Nov. 12, 1929

1,735,783

UNITED STATES PATENT OFFICE

PETER RANDOLPH OLIVER, SR., OF WASHINGTON, DISTRICT OF COLUMBIA

STEERING-WHEEL KNOB

Application filed June 4, 1928. Serial No. 282,763.

The present invention relates to improvements in attachments for automobile steering wheels and has for its principal object to provide a hand grip to facilitate the ready and easy manipulation of the steering wheel by the operator.

A further object is to provide a device of the above mentioned character that can be readily and easily mounted on a steering wheel without necessitating any alterations to the parts of the steering wheel with which the present invention is to be associated.

Still a further object is to provide a steering wheel knob attachment that includes a means for cooperation with the rim and the outer end portion of one of the spokes of the steering wheel to prevent movement of the device, thus rendering the knob positive and efficient at all times in carrying out the purposes for which it is designed.

Still a further object is to provide a device of the above mentioned character which is simple in construction, inexpensive, strong and durable, and further well adapted to the purpose for which it is designed.

Other objects and advantages of the invention will become apparent from the following description when taken in connection with the accompanying drawing.

In the accompanying drawing wherein like reference characters indicate corresponding parts throughout the same:

Figure 1:
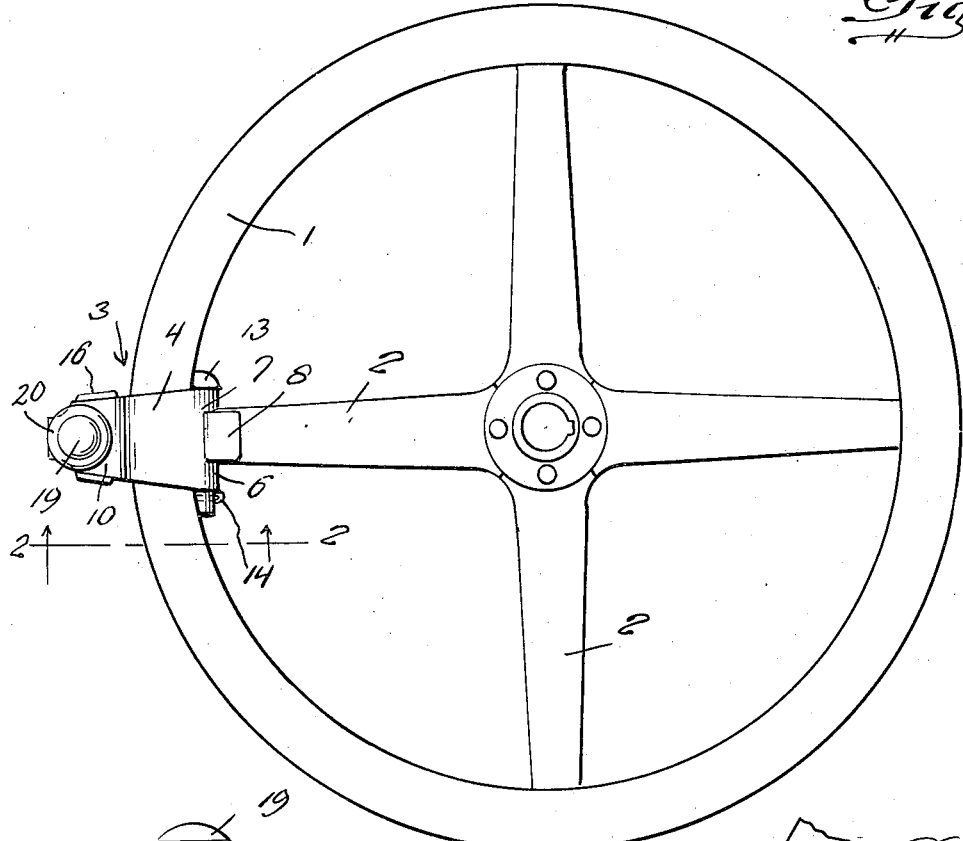
Figure 1 is a top plan view of an automobile steering wheel showing my attachment mounted thereon.

In the drawings wherein for the purpose of illustration is shown the preferred embodiment of my invention, the numeral 1 designates the rim of an automobile steering wheel that is supported by the outer ends of the radially disposed spokes 2 in the manner well known in the art.

My knob attachment comprises a clamping unit designated generally by the numeral 3 that is adapted to embrace the rim of the steering wheel, and this clamping unit comprises the upper and lower plate sections 4 and 5, respectively. The upper plate 4 has its intermediate portoin bent to conform to the contour of the upper portion of the rim 1 of the steering wheel, the inner end portion of the plate 4 being disposed downwardly for disposition adjacent the inner peripheral edge portion of the rim 1.

The inner end portion of the plate 4 has its intermediate portion at the free end thereof cut out whereby to provide depending leg members 6 and 7 respectively that extend downwardly on opposite sides of the adjacent spokes 2. A laterally disposed lug 8 is formed at the inner end portion of the plate 4 between the upper ends of the legs 6 and 7 for rest upon the upper face of the outer end portion of the adjacent spokes as clearly indicated in Figures 1 and 2.

The lower free ends of the spaced leg members are rolled to form registering loops 9, the purpose of which will be presently described.

The outer end portion of the upper plate 4 extends substantially horizontally from the central portion of the rim 1, and the outer end portion of the plate 4 is denoted by the reference character 10. As clearly shown in Figure 1, the sides of the plate 4 gradually converge toward the outer end thereof.

The lower plate 5 is formed at its inner end with a laterally projecting tongue 11 and the free end of this tongue is formed with the transversely disposed loop 12 for disposition between the looped lower ends of the leg members 6 and 7, and a headed pin 13 extends through the communicating looped portions whereby to provide a hinged connection between the upper and lower plate sections of the clamping unit 3 at the inner ends thereof. A cotter pin 14 is disposed through a transverse opening formed in the free end of the headed pin to permit casual displacement of the pin from the looped portion of the plate sections.

Figure 2:
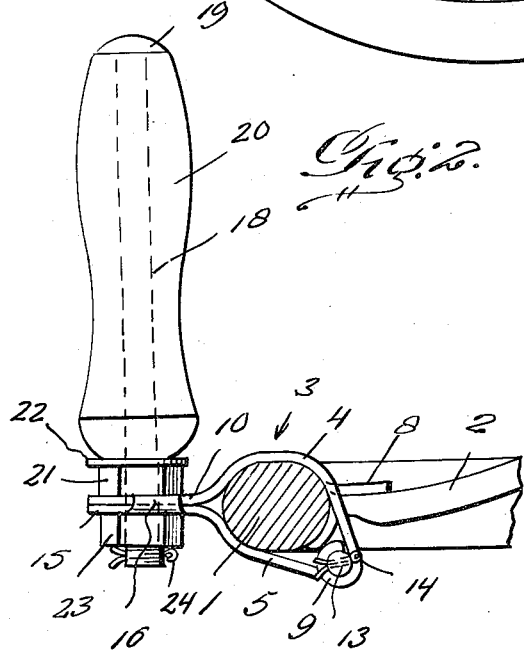
Figure 2 is a sectional view taken approximately on the line 2—2 of Figure 1 looking in the direction of the arrows.

The outer end portion 15 of the lower plate section 5 is also disposed in a substantially horizontal plane for abutting engagement with the under side of the outer end portion 10 of the upper plate section 4 and upwardly projecting ears 16 are formed on the side edges of the outer end portion 15 for engagement with the adjacent portions of the respective side edges of the outer end portions of the upper section 4 in the manner as clearly illustrated in Figures 1 and 2.

Figure 3:
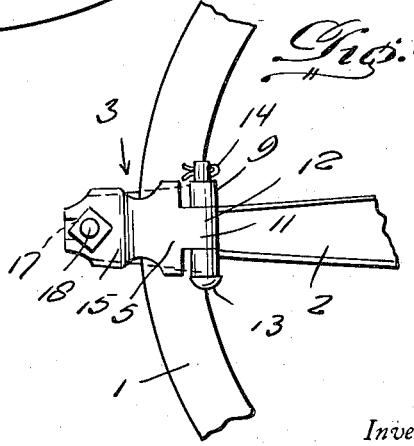
Figure 3 is a bottom plan view of the attachment showing the same positioned on a steering wheel.

The horizontally disposed portion 15 of the plate section 5 is formed with a longitudinal slot in its outer end as indicated by the dotted lines in Figure 3. An opening 18 is formed in the forward end portion 10 of the upper plate section 4 for registration with the inner end portion of this slot and extending vertically therethrough is the lower threaded end of the spindle 18 that is formed at its upper end with a head 19. A wooden knob 20 is loosely supported on the spindle 18. A nut 21 is threaded on the lower threaded end portion of the spindle for engagement with the upper face of the forward end portion 10 of the upper plate section 4 and a washer 22 is positioned on the spindle between the lower end of the elongated knob 20 and the nut 21 as clearly shown in Figure 2.

An additional nut 23 is threaded on the lower end of the spindle for engagement with the bottom face of the forward end portion 15 of the lower plate section 5 whereby to secure the spindle in a rigid manner.

The lower end of the spindle that projects below the nut 23 may be formed with a transverse opening to receive the cotter pin 24 whereby to prevent the displacement of the nut 23 from the lower threaded end of the spindle.

The provision of a steering wheel knob attachment of the above mentioned character will permit the driver of an automobile to more easily turn the steering wheel without causing any strain to be placed upon the hands or body of the operator, and by reason of its simplicity, the steering knob can be attached to the steering wheel without requiring any alterations of the parts of the steering wheel with which the present attachment is associated.

Furthermore, by constructing the clamping unit in the manner shown and described, there will be no possibility of the same working loose or moving with respect to the rim of the steering wheel.

While I have shown the preferred embodiment of my invention, it is to be understood that minor changes in the size, shape and arrangement of parts may be resorted to without departing from the spirit of the invention or the scope of the appended claims.

Having thus described the invention, what I claim as new and desire to secure by Letters Patent is:—

1. A knob attachment for vehicle steering wheels comprising a clamping unit adapted to embrace the rim of the steering wheel, means carried by the inner portion of the clamping unit for embracing the adjacent spoke of the steering wheel, said clamping unit including complementary upper and lower plate sections hingedly secured together at their inner ends, means for detachably securing the outer ends of the plate sections together, and a knob supported on said last mentioned means.

2. A knob attachment for vehicle steering wheels comprising a clamping unit adapted to embrace the rim of the steering wheel, said clamping unit including upper and lower complementary plate like sections, the inner end portion of one plate being bifurcated to provide legs that extend on opposite sides of the adjacent spoke of the steering whel, the free ends of the legs being bent to form registering loops, a laterally disposed tongue formed on the inner end portion of the other plate, the free end of the tongue being formed to a loop for disposition between the aforementioned loop and communicating therewith, a pin extending through the registering loops to provide a hinged connection between the complementary plate sections at their inner ends, a vertically disposed spindle extending through the outer end portions of the plate, securing means for the outer end portions of the plate carried by the spindle, and a knob arranged on the upper portion of the spindle.

3. A knob attachment for vehicle steering wheels comprising a clamping unit adapted to embrace the rim of the steering wheel, said clamping unit including upper and lower complementary plate like sections, the inner end portion of one plate being bifurcated to provide legs that extend on opposite sides of the adjacent spoke of the steering wheel, the free ends of the legs being bent to form registering loops, a laterally disposed tongue formed on the inner end portion of the other plate, the free end of the tongue being formed to a loop for disposition between the aforementioned loop and communicating therewith, a pin extending through the registering loops to provide a hinged connection between the complementary plate sections at their inner ends, the outer end portion of the plate like sections being disposed horizontally in abutting relation, a vertically disposed spindle threaded at its lower end for disposition through communicating openings formed in the outer end portions of the plate-like sections, nuts threaded on the lower end of the spindle for engagement with the respective plate sections, and a knob arranged on the upper portion of the spindle.

4. A knob attachment for vehicle steering wheels comprising a clamping unit adapted to embrace the rim of the steering wheel, said clamping unit including upper and lower complementary plate like sections, the inner end portion of one plate being bifurcated to provide legs that extend on opposite sides of the adjacent spoke of the steering wheel, the free ends of the legs being bent to form registering loops, a laterally disposed tongue formed on the inner end portion of the other plate, the free end of the tongue being formed to a loop for disposition between the aforementioned loop and communicating therewith, a pin extending through the registering loops to provide a hinged connection between the complementary plate sections at their inner ends, the outer end portion of the plate like sections being disposed horizontally in abutting relation, a vertically disposed spindle threaded at its lower end for disposition through communicating openings formed in the outer end portions of the plate-like sections, nuts threaded on the lower end of the spindle for engagement with the respective plate sections, a knob arranged on the upper portion of the spindle, and ears projecting laterally from the side edges of one of the plate sections at the outer end portion thereof for engagement with the adjacent side edges of the outer end portion of the complementary plate-like section.

In testimony whereof I affix my signature.

PETER RANDOLPH OLIVER, Sr.